United States Patent
Allen et al.

(10) Patent No.: US 10,181,159 B1
(45) Date of Patent: Jan. 15, 2019

(54) DETERMINING AND INITIATING INSURANCE CLAIM EVENTS

(71) Applicant: United Services Automobile Association, San Antonio, TX (US)

(72) Inventors: Michael J. Allen, San Antonio, TX (US); Ramsey Devereaux, San Antonio, TX (US); Spencer Read, Helotes, TX (US); David S. Franck, San Antonio, TX (US); Teddy J. Voutour, Helotes, TX (US); Shanna Limas, San Antonio, TX (US); William Chandler, San Antonio, TX (US); Michael P. Burns, San Antonio, TX (US); Daniela Wheeler, Boerne, TX (US); Kathleen L. Swain, Peoria, AZ (US); Cleburne R. Burgess, Fair Oaks Ranch, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 0 days.

(21) Appl. No.: 14/278,182

(22) Filed: May 15, 2014

Related U.S. Application Data (60) Provisional application No. 61/948,192, filed on Mar. 5, 2014, provisional application No. 61/943,906, filed
(Continued)

(51) Int. Cl.
*G06F 19/00* (2018.01)
*G06Q 40/08* (2012.01)

(52) U.S. Cl.
CPC ................. *G06Q 40/08* (2013.01)

(58) Field of Classification Search
CPC ...... G06Q 40/08; G06Q 10/087; G06Q 20/10; G06Q 40/00; G06Q 40/06; G06Q 30/012
(Continued)

(56) References Cited

U.S. PATENT DOCUMENTS

| 5,182,705 A | 1/1993 | Barr et al. |
| 5,235,507 A | 8/1993 | Sackler et al. |

(Continued)

FOREIGN PATENT DOCUMENTS

| EP | 722145 A1 | 7/1996 | |
| WO | 2013036677 A1 | 3/2013 | |
| WO | WO 2013/036677 | * 3/2013 | ............. G06Q 10/00 |

OTHER PUBLICATIONS

Tim Sanidas, Alex Anton, and Michael Cook, U.S. Appl. No. 61/800,561, Drawings, filed Mar. 15, 2013, 9 pages.*
(Continued)

*Primary Examiner* — Jason Borlinghaus
(74) *Attorney, Agent, or Firm* — Fletcher Yoder, P.C.

(57) ABSTRACT

A computer device and method for processing loss related data to detect and initiate insurance claim events. Data is received from one or more sensor devices relating to insured property. Analysis is performed on the received data to determine one or more claim events regarding the insured property. An insurance policy, other product, or service contract associated with the insured property is received and analyzed to determine coverage for the insured property as prescribed by the insurance policy, other product, or service contract. Predefined business rules are applied using the determined one or more claim events and the determined coverage to determine if the insurance policy, other product, or service contract supports a claim regarding the one or
(Continued)

more claim events. Notification of the claim is provided if it is determined supported by the insurance policy, other product, or service contract.

9 Claims, 6 Drawing Sheets

Related U.S. Application Data on Feb. 24, 2014, provisional application No. 61/943,901, filed on Feb. 24, 2014, provisional application No. 61/943,897, filed on Feb. 24, 2014, provisional application No. 61/926,532, filed on Jan. 13, 2014, provisional application No. 61/926,534, filed on Jan. 13, 2014, provisional application No. 61/926,541, filed on Jan. 13, 2014, provisional application No. 61/926,536, filed on Jan. 13, 2014, provisional application No. 61/926,095, filed on Jan. 10, 2014, provisional application No. 61/926,098, filed on Jan. 10, 2014, provisional application No. 61/926,091, filed on Jan. 10, 2014, provisional application No. 61/926,093, filed on Jan. 10, 2014, provisional application No. 61/926,114, filed on Jan. 10, 2014, provisional application No. 61/926,103, filed on Jan. 10, 2014, provisional application No. 61/926,111, filed on Jan. 10, 2014, provisional application No. 61/926,108, filed on Jan. 10, 2014, provisional application No. 61/926,123, filed on Jan. 10, 2014, provisional application No. 61/926,121, filed on Jan. 10, 2014, provisional application No. 61/926,119, filed on Jan. 10, 2014, provisional application No. 61/926,118, filed on Jan. 10, 2014, provisional application No. 61/866,779, filed on Aug. 16, 2013.

(58) Field of Classification Search
USPC ...... 705/4, 36 R, 39, 302; 340/539.1, 539.12
See application file for complete search history.

(56) References Cited

U.S. PATENT DOCUMENTS

| | | | |
|---|---|---|---|
| 5,325,291 A | 6/1994 | Garrett et al. | |
| 5,526,609 A | 6/1996 | Lee et al. | |
| 5,724,261 A | 3/1998 | Denny et al. | |
| 5,950,169 A | 9/1999 | Borghesi et al. | |
| 5,960,338 A | 9/1999 | Foti | |
| 6,029,141 A | 2/2000 | Bezos et al. | |
| 6,049,773 A | 4/2000 | McCormack et al. | |
| 6,526,807 B1 | 3/2003 | Doumit et al. | |
| 6,686,838 B1 | 2/2004 | Rezvani et al. | |
| 6,766,322 B1 | 7/2004 | Bell | |
| 6,826,607 B1* | 11/2004 | Gelvin | B60R 25/1004 340/539.19 |
| 7,203,654 B2 | 4/2007 | Menendez | |
| 7,398,218 B1 | 7/2008 | Bernaski et al. | |
| 7,406,436 B1 | 7/2008 | Reisman | |
| 7,610,210 B2 | 10/2009 | Helitzer et al. | |
| 7,624,069 B2 | 11/2009 | Padgette | |
| 7,711,584 B2 | 5/2010 | Helitzer et al. | |
| 7,716,076 B1* | 5/2010 | Block | G06Q 40/08 705/4 |
| 7,739,133 B1 | 6/2010 | Hail et al. | |
| 7,809,587 B2 | 10/2010 | Dorai et al. | |
| 7,949,548 B2 | 5/2011 | Mathai et al. | |
| 8,004,404 B2 | 8/2011 | Izumi et al. | |
| 8,041,636 B1* | 10/2011 | Hunter | G06Q 20/10 705/26.1 |
| 8,086,523 B1 | 12/2011 | Palmer | |
| 8,106,769 B1 | 1/2012 | Maroney et al. | |
| 8,229,767 B2 | 7/2012 | Birchall | |
| 8,271,303 B2 | 9/2012 | Helitzer et al. | |
| 8,271,308 B2 | 9/2012 | Winkler | |
| 8,271,321 B1 | 9/2012 | Kestenbaum | |
| 8,289,160 B1 | 10/2012 | Billman | |
| 8,306,258 B2 | 11/2012 | Brown | |
| 8,332,242 B1 | 12/2012 | Medina, III | |
| 8,400,299 B1 | 3/2013 | Maroney et al. | |
| 8,428,972 B1 | 4/2013 | Noles et al. | |
| 8,600,104 B2 | 12/2013 | Brown | |
| 8,635,091 B2 | 1/2014 | Amigo et al. | |
| 8,650,048 B1* | 2/2014 | Hopkins | G06Q 40/08 705/4 |
| 8,676,612 B2 | 3/2014 | Helitzer et al. | |
| 8,731,975 B2 | 5/2014 | English et al. | |
| 8,760,285 B2 | 6/2014 | Billman et al. | |
| 8,788,299 B1 | 7/2014 | Medina, III | |
| 8,910,298 B2 | 12/2014 | Gettings et al. | |
| 8,924,241 B2 | 12/2014 | Grosso | |
| 9,015,238 B1 | 4/2015 | Anton et al. | |
| 9,141,995 B1 | 9/2015 | Brinkmann et al. | |
| 9,363,322 B1 | 6/2016 | Anton et al. | |
| 9,613,523 B2 | 4/2017 | Davidson et al. | |
| 9,710,858 B1 | 7/2017 | Devereaux et al. | |
| 9,811,862 B1 | 11/2017 | Allen et al. | |
| 9,818,158 B1 | 11/2017 | Devereaux et al. | |
| 10,032,224 B2 | 7/2018 | Helitzer et al. | |
| 2002/0007289 A1 | 1/2002 | Malin et al. | |
| 2002/0032586 A1 | 3/2002 | Joao | |
| 2002/0035528 A1 | 3/2002 | Simpson et al. | |
| 2002/0055861 A1 | 5/2002 | King et al. | |
| 2002/0087364 A1 | 7/2002 | Lerner et al. | |
| 2002/0116254 A1 | 8/2002 | Stein et al. | |
| 2002/0129001 A1 | 9/2002 | Levkoff et al. | |
| 2002/0178033 A1 | 11/2002 | Yoshioka et al. | |
| 2003/0040934 A1* | 2/2003 | Skidmore | G06Q 10/10 705/4 |
| 2003/0078816 A1 | 4/2003 | Filep | |
| 2003/0097335 A1 | 5/2003 | Moskowitz et al. | |
| 2004/0019507 A1 | 1/2004 | Yaruss et al. | |
| 2004/0034657 A1 | 2/2004 | Zambo et al. | |
| 2004/0064345 A1 | 4/2004 | Ajamian et al. | |
| 2004/0172304 A1 | 9/2004 | Joao | |
| 2005/0050017 A1 | 3/2005 | Ross et al. | |
| 2005/0055248 A1* | 3/2005 | Helitzer | G06Q 40/08 705/4 |
| 2005/0055249 A1 | 3/2005 | Helitzer et al. | |
| 2005/0128074 A1 | 6/2005 | Culpepper et al. | |
| 2005/0197847 A1 | 9/2005 | Smith | |
| 2005/0251427 A1 | 11/2005 | Dorai et al. | |
| 2006/0026044 A1 | 2/2006 | Smith | |
| 2006/0052905 A1 | 3/2006 | Pfingsten et al. | |
| 2006/0218018 A1 | 9/2006 | Schmitt | |
| 2006/0219705 A1 | 10/2006 | Beier et al. | |
| 2007/0005400 A1 | 1/2007 | Eggenberger et al. | |
| 2007/0005404 A1 | 1/2007 | Raz et al. | |
| 2007/0043803 A1 | 2/2007 | Whitehouse et al. | |
| 2007/0088579 A1 | 4/2007 | Richards | |
| 2007/0118399 A1* | 5/2007 | Avinash | G06F 19/322 705/2 |
| 2007/0150319 A1 | 6/2007 | Menendez | |
| 2007/0156463 A1 | 7/2007 | Burton et al. | |
| 2007/0161940 A1 | 7/2007 | Blanchard et al. | |
| 2007/0174467 A1 | 7/2007 | Ballou et al. | |
| 2007/0282639 A1 | 12/2007 | Leszuk et al. | |
| 2007/0299677 A1 | 12/2007 | Maertz | |
| 2008/0033847 A1* | 2/2008 | McIntosh | G06Q 10/087 705/28 |
| 2008/0052134 A1 | 2/2008 | Nowak et al. | |
| 2008/0065427 A1* | 3/2008 | Helitzer | G06Q 40/08 705/4 |
| 2008/0086320 A1 | 4/2008 | Ballew et al. | |
| 2008/0114655 A1 | 5/2008 | Skidmore | |
| 2008/0154651 A1* | 6/2008 | Kenefick | G06Q 40/08 705/4 |
| 2008/0154686 A1* | 6/2008 | Vicino | G06Q 20/10 705/313 |
| 2008/0164769 A1 | 7/2008 | Eck | |
| 2008/0306799 A1 | 12/2008 | Sopko, III et al. | |

(56) References Cited

U.S. PATENT DOCUMENTS

| | | |
|---|---|---|
| 2009/0006175 A1 | 1/2009 | Maertz |
| 2009/0109037 A1 | 4/2009 | Farmer |
| 2009/0119132 A1 | 5/2009 | Bolano et al. |
| 2009/0177500 A1 | 7/2009 | Swahn |
| 2009/0216349 A1 | 8/2009 | Kwon et al. |
| 2009/0240531 A1 | 9/2009 | Hilborn |
| 2009/0265193 A1* | 10/2009 | Collins ............... G06Q 30/0185 705/4 |
| 2009/0265207 A1 | 10/2009 | Johnson |
| 2009/0266565 A1 | 10/2009 | Char |
| 2009/0279734 A1 | 11/2009 | Brown |
| 2009/0287509 A1 | 11/2009 | Basak et al. |
| 2010/0049552 A1 | 2/2010 | Fini et al. |
| 2010/0131307 A1 | 5/2010 | Collopy et al. |
| 2010/0174566 A1 | 7/2010 | Helitzer et al. |
| 2010/0241464 A1 | 9/2010 | Amigo et al. |
| 2010/0274590 A1 | 10/2010 | Compangano et al. |
| 2010/0274859 A1 | 10/2010 | Bucuk |
| 2010/0299162 A1 | 11/2010 | Kwan |
| 2011/0043958 A1 | 2/2011 | Nakamura et al. |
| 2011/0137684 A1 | 6/2011 | Peak et al. |
| 2011/0137685 A1* | 6/2011 | Tracy .................... G06Q 40/08 705/4 |
| 2011/0161117 A1* | 6/2011 | Busque .................. G06Q 40/08 705/4 |
| 2011/0295624 A1* | 12/2011 | Chapin .................. G06Q 40/08 705/4 |
| 2011/0320226 A1 | 12/2011 | Graziano et al. |
| 2012/0016695 A1 | 1/2012 | Bernard et al. |
| 2012/0028635 A1 | 2/2012 | Borg et al. |
| 2012/0046975 A1 | 2/2012 | Stolze |
| 2012/0101855 A1 | 4/2012 | Collins et al. |
| 2012/0116820 A1* | 5/2012 | English ............... H04L 61/2007 705/4 |
| 2012/0143634 A1 | 6/2012 | Beyda et al. |
| 2012/0158436 A1 | 6/2012 | Bauer et al. |
| 2012/0176237 A1* | 7/2012 | Tabe .................... A61B 5/6804 340/539.12 |
| 2012/0290333 A1* | 11/2012 | Birchall ................ G06Q 40/08 705/4 |
| 2012/0311053 A1 | 12/2012 | Labrie et al. |
| 2012/0323609 A1 | 12/2012 | Fini |
| 2013/0040636 A1 | 2/2013 | Borg et al. |
| 2013/0060583 A1 | 3/2013 | Collins et al. |
| 2013/0073303 A1 | 3/2013 | Hsu |
| 2013/0144658 A1* | 6/2013 | Schnabolk ............. G06Q 40/08 705/4 |
| 2013/0226624 A1 | 8/2013 | Blessman et al. |
| 2013/0253961 A1 | 9/2013 | Feldman et al. |
| 2013/0317732 A1 | 11/2013 | Borg et al. |
| 2014/0046701 A1 | 2/2014 | Steinberg et al. |
| 2014/0067137 A1 | 3/2014 | Amelio et al. |
| 2014/0108275 A1 | 4/2014 | Heptonstall |
| 2014/0114693 A1* | 4/2014 | Helitzer ................ G06Q 40/08 705/4 |
| 2014/0132409 A1* | 5/2014 | Billman ................ G08B 19/00 340/539.1 |
| 2014/0136242 A1* | 5/2014 | Weekes ................. G06Q 40/08 705/4 |
| 2014/0142989 A1 | 5/2014 | Grosso |
| 2014/0180723 A1 | 6/2014 | Cote et al. |
| 2014/0195272 A1 | 7/2014 | Sadiq et al. |
| 2014/0257862 A1 | 9/2014 | Billman et al. |
| 2014/0257863 A1 | 9/2014 | Maastricht et al. |
| 2014/0278573 A1* | 9/2014 | Cook .................... G06Q 40/08 705/4 |
| 2014/0279593 A1 | 9/2014 | Pershing |
| 2014/0322676 A1 | 10/2014 | Raman |
| 2014/0327995 A1 | 11/2014 | Panjwani et al. |
| 2014/0358592 A1* | 12/2014 | Wedig ................... G06Q 40/08 705/4 |
| 2014/0375440 A1 | 12/2014 | Rezvani et al. |
| 2014/0380264 A1 | 12/2014 | Misra et al. |
| 2015/0006206 A1* | 1/2015 | Mdeway ............... G06Q 40/08 705/4 |
| 2015/0025915 A1 | 1/2015 | Lekas |
| 2015/0221051 A1 | 8/2015 | Settino |
| 2016/0005130 A1 | 1/2016 | Devereaux et al. |
| 2016/0055594 A1 | 2/2016 | Emison |
| 2016/0104250 A1 | 4/2016 | Allen et al. |

OTHER PUBLICATIONS

Tim Sanidas, Alex Anton, and Michael Cook, U.S. Appl. No. 61/800,561, Specification, filed Mar. 15, 2013.*
T. Sanidas et al., U.S. Appl. No. 61/800,561, filed Mar. 15, 2013, Drawings, 9 pages.
T. Sanidas et al., U.S. Appl. No. 61/800,561, filed Mar. 15, 2013, Specification, 19 pages.
Telematics Set the Stage the Improved Auto Claims Management by Sam Friedman (Oct. 10, 2012); 3 pages.
U.S. Appl. No. 14/862,776, Devereaux et al., filed Sep. 23, 2015.
U.S. Appl. No. 14/251,392, Allen et al., filed Apr. 11, 2014.
U.S. Appl. No. 14/251,377, Devereaux et al., filed Apr. 11, 2014.
U.S. Appl. No. 14/251,404, Devereaux et al., filed Apr. 11, 2014.
U.S. Appl. No. 14/251,411, Allen et al., filed Apr. 11, 2014.
U.S. Appl. No. 14/273,877, Allen et al., filed May 9, 2014.
U.S. Appl. No. 14/273,889, Devereaux et al., filed May 9, 2014.
U.S. Appl. No. 14/273,918, Allen et al., filed May 9, 2014.
U.S. Appl. No. 14/278,182, Allen et al., filed May 15, 2014.
U.S. Appl. No. 14/278,202, Allen et al., filed May 15, 2014.
U.S. Appl. No. 14/303,336, Devereaux et al., filed Jun. 12, 2014.
U.S. Appl. No. 14/303,347, Devereaux et al., filed Jun. 12, 2014.
U.S. Appl. No. 14/303,370, Allen et al., filed Jun. 12, 2014.
U.S. Appl. No. 14/303,382, Allen et al., filed Jun. 12, 2014.
U.S. Appl. No. 14/324,534, Devereaux et al., filed Jul. 7, 2014.
U.S. Appl. No. 14/324,546, Devereaux et al., filed Jul. 7, 2014.
U.S. Appl. No. 14/324,609, Devereaux et al., filed Jul. 7, 2014.
U.S. Appl. No. 14/324,618, Devereaux et al., filed Jul. 7, 2014.
U.S. Appl. No. 14/324,748, Devereaux et al., filed Jul. 7, 2014.
U.S. Appl. No. 14/324,759, Devereaux et al., filed Jul. 7, 2014.
U.S. Appl. No. 15/244,847, Devereaux et al., filed Aug. 23, 2016.
U.S. Appl. No. 61/800,561, Sanidas et al., filed Mar. 15, 2013.
U.S. Appl. No. 61/866,779, Bergner, filed Aug. 16, 2013.
U.S. Appl. No. 61/926,091, Allen et al., filed Jan. 10, 2014.
U.S. Appl. No. 61/926,093, Allen et al., filed Jan. 10, 2014.
U.S. Appl. No. 61/926,095, Allen et al., filed Jan. 10, 2014.
U.S. Appl. No. 61/926,098, Allen et al., filed Jan. 10, 2014.
U.S. Appl. No. 61/926,103, Devereaux et al., filed Jan. 10, 2014.
U.S. Appl. No. 61/926,108, Allen et al., filed Jan. 10, 2014.
U.S. Appl. No. 61/926,111, Allen et al., filed Jan. 10, 2014.
U.S. Appl. No. 61/926,114, Devereaux et al., filed Jan. 10, 2014.
U.S. Appl. No. 61/926,118, Devereaux et al., filed Jan. 10, 2014.
U.S. Appl. No. 61/926,119, Devereaux et al., filed Jan. 10, 2014.
U.S. Appl. No. 61/926,121, Devereaux et al., filed Jan. 10, 2014.
U.S. Appl. No. 61/926,123, Devereaux et al., filed Jan. 10, 2014.
U.S. Appl. No. 61/926,532, Allen et al., filed Jan. 13, 2014.
U.S. Appl. No. 61/926,534, Allen et al., filed Jan. 13, 2014.
U.S. Appl. No. 61/926,536, Allen et al., filed Jan. 13, 2014.
U.S. Appl. No. 61/926,541, Allen et al., filed Jan. 13, 2014.
U.S. Appl. No. 61/943,897, Devereaux et al., filed Feb. 24, 2014.
U.S. Appl. No. 61/943,901, Devereaux et al., filed Feb. 24, 2014.
U.S. Appl. No. 61/943,906, Devereaux et al., filed Feb. 24, 2014.
U.S. Appl. No. 61/948,192, Davis et al., filed Mar. 5, 2014.
U.S. Appl. No. 62/311,491, Moy, filed Mar. 22, 2016.
U.S. Appl. No. 62/325,250, Rodgers et al., filed Apr. 20, 2016.
U.S. Appl. No. 62/351,427, Devereaux et al., filed Jun. 17, 2016.
U.S. Appl. No. 62/351,441, Flachsbart et al., filed Jun. 17, 2016.
U.S. Appl. No. 62/351,451, Chavez et al., filed Jun. 17, 2016.
Zevnik, Richard. The Complete Book of Insurance. Sphinx. 2004. pp. 76-78.
U.S. Appl. No. 14/251,377, filed Apr. 11, 2014, Devereaux et al.
U.S. Appl. No. 14/251,392, filed Apr. 11, 2014, Allen et al.
U.S. Appl. No. 14/251,404, filed Apr. 11, 2014, Devereaux et al.
U.S. Appl. No. 14/251,411, filed Apr. 11, 2014, Allen et al.
U.S. Appl. No. 14/273,877, filed May 9, 2014, Allen et al.

(56) References Cited

OTHER PUBLICATIONS

U.S. Appl. No. 14/273,889, filed May 9, 2014, Devereaux et al.
U.S. Appl. No. 14/273,918, filed May 9, 2014, Allen et al.
U.S. Appl. No. 14/278,182, filed May 15, 2014, Allen et al.
U.S. Appl. No. 14/278,202, filed May 15, 2014, Allen et al.
U.S. Appl. No. 14/303,336, filed Jun. 12, 2014, Devereaux et al.
U.S. Appl. No. 14/303,347, filed Jun. 12, 2014, Devereaux et al.
U.S. Appl. No. 14/303,370, filed Jun. 12, 2014, Allen et al.
U.S. Appl. No. 14/303,382, filed Jun. 12, 2014, Allen et al.
U.S. Appl. No. 14/305,732, filed Jun. 16, 2014, Devereaux et al.
U.S. Appl. No. 14/324,534, filed Jul. 7, 2014, Devereaux et al.
U.S. Appl. No. 14/324,546, filed Jul. 7, 2014, Devereaux et al.
U.S. Appl. No. 14/324,609, filed Jul. 7, 2014, Devereaux et al.
U.S. Appl. No. 14/324,618, filed Jul. 7, 2014, Devereaux et al.
U.S. Appl. No. 14/324,748, filed Jul. 7, 2014, Devereaux et al.
U.S. Appl. No. 14/324,759, filed Jul. 7, 2014, Devereaux et al.
U.S. Appl. No. 14/494,207, filed Sep. 23, 2014, Campbell.
U.S. Appl. No. 14/572,413, filed Dec. 16, 2014, Devereaux et al.
U.S. Appl. No. 14/573,981, filed Dec. 15, 2014, Allen et al.
U.S. Appl. No. 14/862,776, filed Sep. 23, 2015, Devereaux et al.
U.S. Appl. No. 14/941,225, filed Nov. 13, 2015, Billman et al.
U.S. Appl. No. 14/941,262, filed Nov. 13, 2015, Hopkins et al.
U.S. Appl. No. 15/244,847, filed Aug. 23, 2016, Devereaux et al.
U.S. Appl. No. 15/365,555, filed Nov. 30, 2016, Devereaux et al.
U.S. Appl. No. 15/365,611, filed Nov. 30, 2016, Devereaux et al.
U.S. Appl. No. 15/365,676, filed Nov. 30, 2016, Devereaux et al.
U.S. Appl. No. 15/365,706, filed Nov. 30, 2016, Devereaux et al.
U.S. Appl. No. 15/365,721, filed Nov. 30, 2016, Devereaux et al.
U.S. Appl. No. 15/365,725, filed Nov. 30, 2016, Devereaux et al.
U.S. Appl. No. 15/365,736, filed Nov. 30, 2016, Devereaux et al.
U.S. Appl. No. 15/365,745, filed Nov. 30, 2016, Devereaux et al.
U.S. Appl. No. 15/365,754, filed Nov. 30, 2016, Devereaux et al.
U.S. Appl. No. 15/365,764, filed Nov. 30, 2016, Devereaux et al.
U.S. Appl. No. 15/365,773, filed Nov. 30, 2016, Devereaux et al.
U.S. Appl. No. 15/365,786, filed Nov. 30, 2016, Devereaux et al.
Farmers Next Generation Homeowners Policy, Missouri, by Farmers insurance Exchange; 2008; 50 pages.
Gonzalez Ribeiro, Ana, "Surprising things your home insurance covers," Jan. 12, 2012 in Insurance; 4 pages.

* cited by examiner

DETERMINING AND INITIATING INSURANCE CLAIM EVENTS

CROSS REFERENCE TO RELATED APPLICATIONS

This application claims priority to U.S. Patent Application Ser. No. 61/866,779 filed Aug. 16, 2013; 61/926,093 filed Jan. 10, 2014; 61/926,091 filed Jan. 10, 2014; 61/926,095 filed Jan. 10, 2014; 61/926,098 filed Jan. 10, 2014; 61/926,103 filed Jan. 10, 2014; 61/926,108 filed Jan. 10, 2014; 61/926,111 filed Jan. 10, 2014; 61/926,114 filed Jan. 10, 2014; 61/926,118 filed Jan. 10, 2014; 61/926,119 filed Jan. 10, 2014; 61/926,121 filed Jan. 10, 2014; 61/926,123 filed Jan. 10, 2014; 61/926,536 filed Jan. 13, 2014; 61/926,541 filed Jan. 13, 2014; 61/926,534 filed Jan. 13, 2014; 61/926,532 filed Jan. 13, 2014; 61/943,897 filed Feb. 24, 2014; 61/943,901 filed Feb. 24, 2014; 61/943,906 filed Feb. 24, 2014; and 61/948,192 filed Mar. 5, 2014 which are each incorporated herein by reference in its entirety.

FIELD OF THE INVENTION

The disclosed embodiments generally relate to a method and computerized system for managing insurance and related products and services, and more particularly, to using data captured from an insured property or appliances within an insured property for detecting and initiating insurance claim events.

BACKGROUND OF THE INVENTION

Smart home functionality is a maturing space, but the opportunity for insurance companies remains largely untapped. Currently, there are few useful early warning and loss mitigation systems that actually save costs and time for both the property owner and insurance company alike. For instance, currently, homeowners insurance claim events are detected by the homeowner, who contacts the insurance company to inform them that there has been a loss. However, the loss could be mitigated with automated warning and detection systems that interface with the insurance company systems. For example, homeowners may not become aware of minor to medium hail damage to their roofs until such time as that damage leads to water damage to the interior or exterior of the home. If they could be made aware of such loss events earlier and then take corrective actions, then the damage could have been mitigated or avoided.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a computer device and method for processing loss related data to detect and initiate insurance claim events is provided. Data is received from one or more sensor devices relating to an insured property and/or appliances associated with the property. Analysis is performed on the received data to determine one or more claim events regarding the insured property. An insurance policy, other product, or service contract associated with the property is received and analyzed to determine coverage for the insured property as prescribed by the insurance policy, other product, or service contract. Predefined business rules are applied using the determined one or more claim events and the determined coverage to determine if the insurance policy, other product, or service contract supports a claim regarding the one or more claim events. Notification of the claim is provided if it is determined supported by the insurance policy, other product, or service contract.

In another aspect, modification to the insurance policy, other product, or service contract is determined and preferably recommended if it is determined the insurance policy, other product, or service contract does not support a claim regarding the one or more claim events. In yet another aspect, the amount owed is determined for the one or more claim events. In another aspect, one or more third party vendors are identified and preferably recommended regarding repairs or changes to be made to an insured property and/or appliances associated with the property based upon the determined one or more claim events.

This summary section is provided to introduce a selection of concepts in a simplified form that are further described subsequently in the detailed description section. This summary section is not intended to identify key features or essential features of the claimed subject matter, nor is it intended to be used to limit the scope of the claimed subject matter.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims. All publications and references cited herein are expressly incorporated herein by reference in their entirety. For instance, commonly assigned U.S. Pat. Nos. 8,289,160 and 8,400,299 are related to certain embodiments described here and are each incorporated herein by reference in their entirety.

As used herein, the term "insurance" refers to a contract between an insurer, also known as an insurance company, and an insured, also known as a policyholder, in which the insurer agrees to indemnify the insured for specified losses, costs, or damage on specified terms and conditions in exchange of a certain premium amount paid by the insured. In a typical situation, when the insured suffers some loss for which he/she may have insurance the insured makes an insurance claim to request payment for the loss. It is to be appreciated for the purpose of the embodiments illustrated herein, the insurance policy is not to be understood to be limited to a residential or homeowners insurance policy, but can be for a commercial, umbrella, and other insurance policies known by those skilled in the art.

As used herein, "loss related data" means data or information relating to a loss or potential loss to insured property.

As used herein, "insured property" means a dwelling, other buildings or structures, personal property, or business property that may be covered by an insurance policy.

Also, as used herein, "claim handling" means investigating, adjusting, evaluating, or paying an insurance claim as well as communications with an insured and others regarding the claim.

Figure 1:
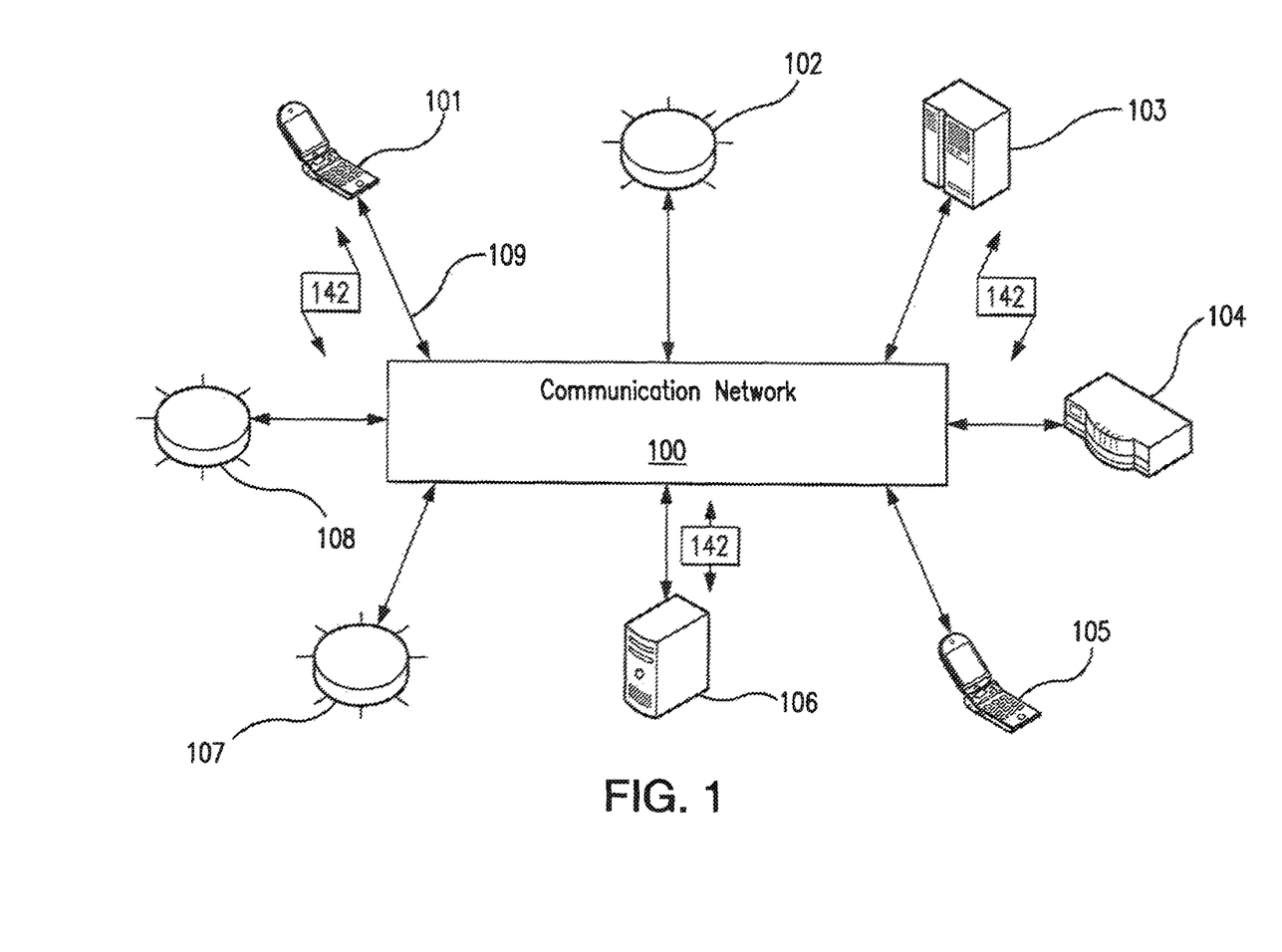
FIG. 1 illustrates an example communication network in accordance with an illustrated embodiment.

Turning now descriptively to the drawings, in which similar reference characters denote similar elements throughout the several views, FIG. 1 depicts an exemplary communications network 100 in which below illustrated embodiments may be implemented.

It is to be understood a communication network 100 is a geographically distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as an insured property 300 or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

FIG. 1 is a schematic block diagram of an example communication network 100 illustratively comprising nodes/devices 101-108 (e.g., sensors 102, client computing devices 103, smart phone devices 105, servers 106, routers 107, switches 108 and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C++" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
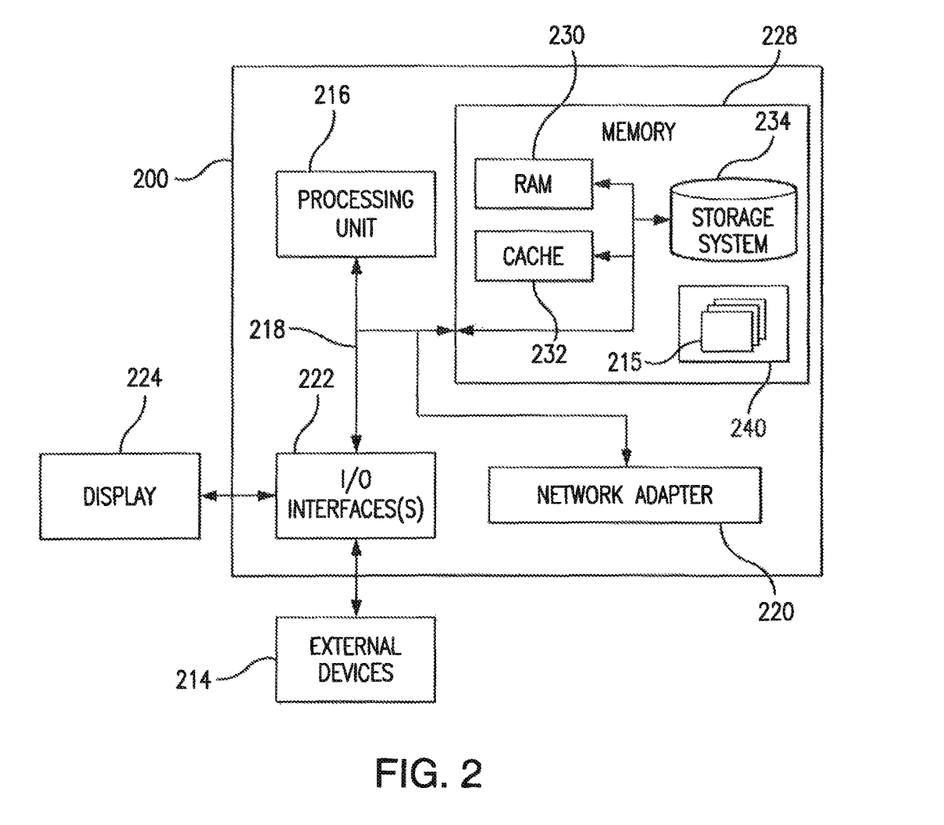
FIG. 2 illustrates a network computer device/node in accordance with an illustrated embodiment.

FIG. 2 is a schematic block diagram of an example network computing device 200 (e.g., one of network devices 101-108) that may be used (or components thereof) with one or more embodiments described herein, e.g., as one of the nodes shown in the network 100. As explained above, in different embodiments these various devices be configured to communicate with each other in any suitable way, such as, for example, via communication network 100.

Device 200 is only one example of a suitable system and is not intended to suggest any limitation as to the scope of use or functionality of embodiments of the invention described herein. Regardless, computing device 200 is capable of being implemented and/or performing any of the functionality set forth herein.

Computing device 200 is operational with numerous other general purpose or special purpose computing system environments or configurations. Examples of well-known computing systems, environments, and/or configurations that may be suitable for use with computing device 200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed data processing environments that include any of the above systems or devices, and the like.

Computing device 200 may be described in the general context of computer system-executable instructions, such as program modules, being executed by a computer system. Generally, program modules may include routines, programs, objects, components, logic, data structures, and so on that perform particular tasks or implement particular abstract data types. Computing device 200 may be practiced in distributed data processing environments where tasks are performed by remote processing devices that are linked through a communications network. In a distributed data processing environment, program modules may be located in both local and remote computer system storage media including memory storage devices.

Device 200 is shown in FIG. 2 in the form of a general-purpose computing device. The components of device 200 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 200 typically includes a variety of computer system readable media. Such media may be any available media that is accessible by device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 215, such as analyzer module 306 and appliance analyzer module 308 described below, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the invention as described herein.

Device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, device 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which embodiments of the below described present invention may be implemented. FIGS. 1 and 2 are exemplary of a suitable environment and are not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

Figure 3A:
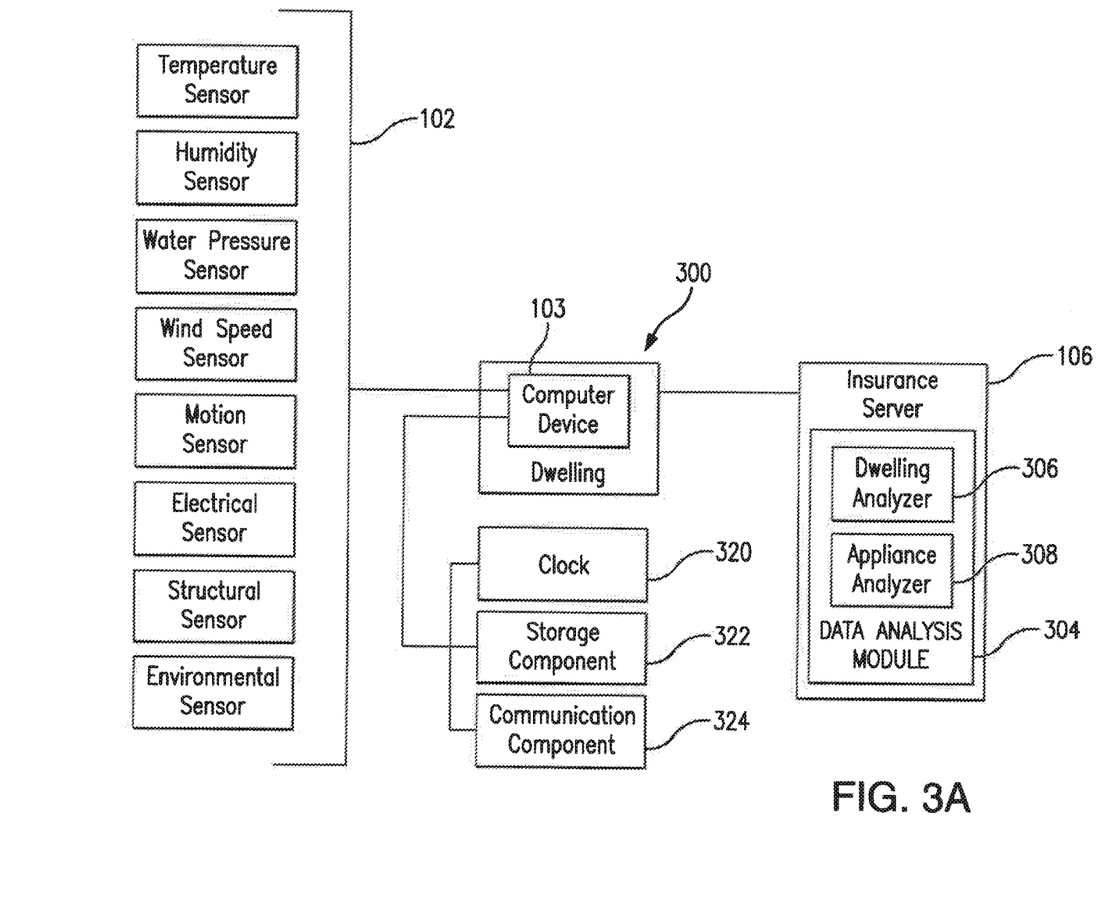
FIG. 3A is a block diagram of an insured property from which sensor data is captured for subsequent analysis in accordance with an illustrated embodiment.

With the exemplary communication network 100 (FIG. 1) and computing device 200 (FIG. 2) being generally shown and discussed above, description of certain illustrated embodiments of the present invention will now be provided. With reference now to FIG. 3A, an example of an insured property 300 is shown which is to be understood to be any type of structure (e.g., residential, commercial, retail, municipal, etc.) in which the capture and analysis of sensor data (102) is useful for the reasons at least described below. Insured property 300 preferably includes a computing device 103 for capturing data from a plurality of sensors 102 which capture data regarding various aspects of insured property 300, as further described below. It is to be understood insured property computing device 103 may be located in any location, and its position is not limited to the example shown.

Computing device 103 is preferably configured and operational to receive (capture) data from various sensors 102 regarding certain aspects (including functional and operational) of insured property 300 (described further below) and transmit that captured data to a remote server 106, via network 100. It is noted device 103 may perform analytics regarding the captured sensor data regarding insured property 300 and/or the remote server 106, preferably located or controlled by an insurance company/carrier, may perform such analytics, as also further described below. It is also to be understood in other embodiments, data from sensors 102 may be transmitted directly to remote server 106, via network 100, thus either obviating the need for computing device 103 or mitigating its functionality to capture all data from sensors 102.

In the illustrated embodiment of FIG. 3A, computing device 103 is shown coupled to various below described sensor types 102. Although various sensor types 102 are described below and shown in FIGS. 3A and 3B, the sensor types described and shown herein are not intended to be exhaustive as embodiments of the present invention may encompass any type of known or unknown sensor type which facilitates the purposes and objectives of the certain illustrated embodiments described herein. Exemplary sensor types include (but are not limited to):

Motion Sensor—

One type of detection device 102 detects motion within a detection range. Thus, motion sensor 102 may be placed to detect when people, animals and/or objects move within sensor's 102 field of vision. Another type of sensor 102 may sense motion in the structure to which sensor 102 is attached. Although structures typically do not move, in the event of an earthquake, flood, damage to that part of the structure, and/or other devastating event, motion sensor 102 may detect the movement of the structure itself.

Temperature Sensor—

Temperature sensor 102 detects the temperature of the desired medium. Thus, temperature sensor 102 may be configured to measure the temperature of ambient air or of a specific surface (e.g., the wall to which temperature sensor 102 is attached). It is contemplated herein that temperature sensor 102 may be placed outside the structure (e.g., on an outside wall and/or the roof), inside the structure (e.g., on an interior wall, an interior ceiling, an interior floor, a basement, an attic, a kitchen, a bathroom, a bedroom, a workspace, etc.), or at a boundary therebetween.

Humidity Sensor—

As with other sensors 102, humidity sensor 102 may be placed anywhere inside/outside/on the structure as recognized by those skilled in the art.

Gas Detection Sensor—

Detects the presence of various gasses. As with other sensors 102, gas detection sensor 102 may be placed anywhere inside/outside/on the structure as recognized by those skilled in the art. For exemplary purposes only and without limitation, gas detection sensor may be configured to detect the presence of carbon monoxide (or any other harmful gasses, such as radon), oxygen, and/or methane (or any other flammable gasses). Further, the readings may be binary (e.g., either the gas is present or it is not present), or the readings may be quantitative (e.g., the percentage of air the comprises the gas, parts per million of the gas).

Smoke Detector Sensor—

Detects the presence of smoke. As with other sensors 102, smoke detection sensor 102 may be placed anywhere inside/outside/on the structure as recognized by those skilled in the art. The readings of smoke detection sensor may be binary (e.g., either the gas is present or it is not present), or the readings may be quantitative (e.g., the percentage of air the comprises smoke, parts per million of smoke).

Water Pressure Sensor—

Detects the water pressure at various locations within the structure. Water pressure sensors 102 may be placed anywhere inside or outside the structure and thus may provide information related to the stresses being induced upon the structure's plumbing system. This information may be utilized by management module to indicate a plumbing system that is operating close to stress limits, and thus, a structure for which water damage may be more likely.

Water Flow Sensor—

Detects the amount of water flowing through selected points in the plumbing system (which includes but is not limited to water lines, sewer lines, the HVAC system, appliances, fire suppression systems, lawn sprinklers, and sump pumps). Water flow sensor 102 may be placed anywhere inside or outside the structure and thus may provide information related to the amount of water being routed to the structure, and more particularly, which parts of the structure are receiving exactly (or approximately) how much water. It is contemplated herein that water flow sensors 102 may detect, for exemplary purposes only and without limitation, hot water in a water heater, hot water input pipes, cold water input pipes, and/or output pipes (e.g., pipes removing utilized water).

Water Detection Sensor—

Detects any amount of water escaping through selected points throughout the plumbing system (which includes but is not limited to water lines, sewer lines, the HVAC system, appliances, fire suppression systems, lawn sprinklers, and sump pumps). Water detection sensor 102 may be placed anywhere inside the structure and thus may provide information related to water escaping and accumulating inside the structure, which parts of the structure have water accumulation and how much water. It is contemplated herein that water detection sensors 102 may detect, for exemplary purposes only and without limitation, flood waters entering from exterior to interior of the structure, water overflow from sump pump(s), drains or broken pipes and/or sewer/water back-ups.

Wind Speed Sensor—

Wind speed sensor 102 detects the wind speed at that location and may be placed anywhere inside or outside the structure.

Air Pressure Sensor—

Air pressure sensor 102 may be placed anywhere inside or outside the structure. This information may be analyzed, for example, to determine how quickly and easily the structure equalizes air pressure changes to the outside ambient air.

Electrical System Sensor—

Electrical system sensor 102 detects the operational parameters of the structure's electrical system. Readings from sensor 102 could be used to determine if the voltage is (persistently) too high, too low, or if the voltage frequently drops and/or spikes. Such conditions may suggest that the structure 300 is at risk for fire. Other types of electrical measurements could be taken, such as readings of current flowing through the electrical system. Still other types of electrical measurements could be determined include how energy is used and at what times of day it is used, etc.

Structural Sensor—

Structural sensor 102 may be configured to detect the (changing) conditions of the structure's elements (e.g., support beams, floors, ceilings, roofs, walls, etc.). Structural readings from one or more locations inside and/or outside the structure could thus be recorded by sensor 102 and transmitted to management module 105.

Environmental Sensor—

Environmental sensor 102 may be configured to detect various environmental conditions relating to structure 300, such as the air quality present in the structure, the presence of mold/bacteria/algae/lead paint or any contaminant adverse to human health (whether airborne or attached to a portion of the structure).

Camera Sensor—

Camera sensors include visible light cameras, infrared cameras, two-dimensional (2D) cameras, three-dimensional (3D) cameras, thermal cameras, aerial imagery, radar-capable sensors, sensors that detect other wavelengths, and/or any combination thereof.

Multi-Function Computing Devices—

Multi-function computing devices 102 include, for exemplary purposes only and without limitation, smart phones, tablets, cellular phones, laptops, desktops, webcams, smart TV camera devices (and other appliance camera devices), and/or similar devices. Such devices may passively contribute (e.g., periodically gather informatics and communicate it to management module 105 without user action) and/or actively contribute (e.g., the user must proactively gather data and/or proactively send the data after it has been gathered, the gathering being proactive and/or passive).

With exemplary sensors 102 identified and briefly described above, and as will be further discussed below, it is to be generally understood sensors 102 preferably record certain data parameters relating to products and services provided by an insurance carrier, such as USAA, to determine maintenance and repair issues; determine age and condition of an insured property; and other value added services such as those described below. It is to be understood and appreciated the aforementioned sensors 102 may be configured as wired and wireless types integrated in a networked environment (e.g., WAN, LAN, WiFi, 802.11X, 3G, LTE, etc.), which may also have an associated IP address. It is to be further appreciated the sensors 102 may consist of internal sensors located within the structure of insured property 300; external sensors located external of the structure of insured property 300; sound sensors for detecting ambient noise (e.g., for detecting termite and rodent activity, glass breakage, intruders, etc.); camera sensors such as those consisting of camera standalone devices, or by integrating into existing camera devices in an insured property 300. It is additionally to be understood and appreciated that sensors 102 can be networked into a central computer hub (e.g., device 103) in an insured property to aggregate collected sensor data packets. Aggregated data packets can be analyzed in either a computer system (e.g., device 103) or via an external computer environment (e.g., server 106). Additionally, it is to be understood data packets collected from sensors 102 can be aggregated in computing device 103 and send as an aggregated packet to server 106 for subsequent analysis whereby data packets may be transmitted at prescribed time intervals (e.g., a benefit is to reduce cellular charges in that some insured property's 300 may not have Internet access or cellular service is backup when Internet service is nonfunctioning).

In accordance with an illustrated embodiment, in addition to the aforementioned, the sensors 102 being utilized relative to insured property 300, computing device 103 may additionally be coupled to a Clock 320 which may keep track of time for device 103, thereby allowing a given item of data to be associated with the time at which the data was captured. For example, device 103 may recurrently capture readings of temperature, wind speed, humidity, appliance operating times, etc., and may timestamp each reading. The time at which the readings are taken may be used to reconstruct events or for other analytic purposes, such as those described below. For example, the timestamps on wall structure readings taken by a structural sensor during a hurricane may allow it to be determined, after the hurricane has occurred, if the insured property is in need of immediate repair.

A storage component 322 may further be provided and utilized to store data readings and/or timestamps in device 103. For example, storage component 322 may comprise, or may otherwise make use of, magnetic or optical disks, volatile random-access memory, non-volatile random-access memory, or any other type of storage device. There may be sufficient data storage capacity to store several hours or several days worth of readings. For example, there might be various plumbing issues which can affect the water pressure in a plumbing system to be low. Storage component 322 might have sufficient storage capacity to allow, for example five days of readings to be stored, thereby allowing to narrow down the cause of low water pressure.

A communication component 324 may further be provided and utilized to communicate recorded information from computing device 103 to an external location, such as computer server 106, which may be associated with an insurance carrier such as USAA. Communication component 324 may be, or may comprise, a network communication card such as an Ethernet card, a WiFi card, or any other communication mechanism. However, communication component 324 could take any form and is not limited to these examples. Communication component 324 might encrypt data that it communicates, in order to protect the security and/or privacy of the data. Communication component 324 may communicate data recorded by device 103 (e.g., data stored in storage component 322) to an external location, such as server 106. For example, server 106 may be operated by an insurance company, and may collect data from computing device 103 in order to learn about maintenance/repair needs and other analytics relative to insured property 300 in which device 103 located. Communication component 324 may initiate communication sessions with server 106. Or, as another example, server 106 may contact device 103, through communication component 324, in order to receive data that has been stored by device 103. Additionally, data from sensors 102, clock 320 and/or storage component 322 may be communicated directly to server 106, via network 100, thus obviating or mitigating the need for computing device 103.

In the example of FIG. 3A, communication component 324 (which is shown, in FIG. 3A, as being part of, or used by, computing device 103) communicates data to server 106. Server 106 may comprise, or otherwise may cooperate with, a data analysis module 304, which may analyze data in some manner. Data analysis module 304 may comprise various types of sub-modules, such as analyzer 306 and appliance analyzer 308. In general, analyzer 306 may perform an analysis of collected data regarding various aspects of insured property 300, such as data that used to determine age and condition of insured property 300; determine maintenance and repair needs for insured property 300 and the like. Appliance analyzer 308 may perform an analysis of collected data regarding various appliances located in or around insured property 300, such as their age, operating parameters, maintenance/repair issues, and the like. analyzer 306 and appliance analyzer 308 may overlap somewhat in terms of the techniques they employ—e.g., both of these sub-modules may analyze facts such as room temperature, humidity, etc., and attempt to draw some conclusions based on whether and/or how these facts have changed over time.

Figure 3B:
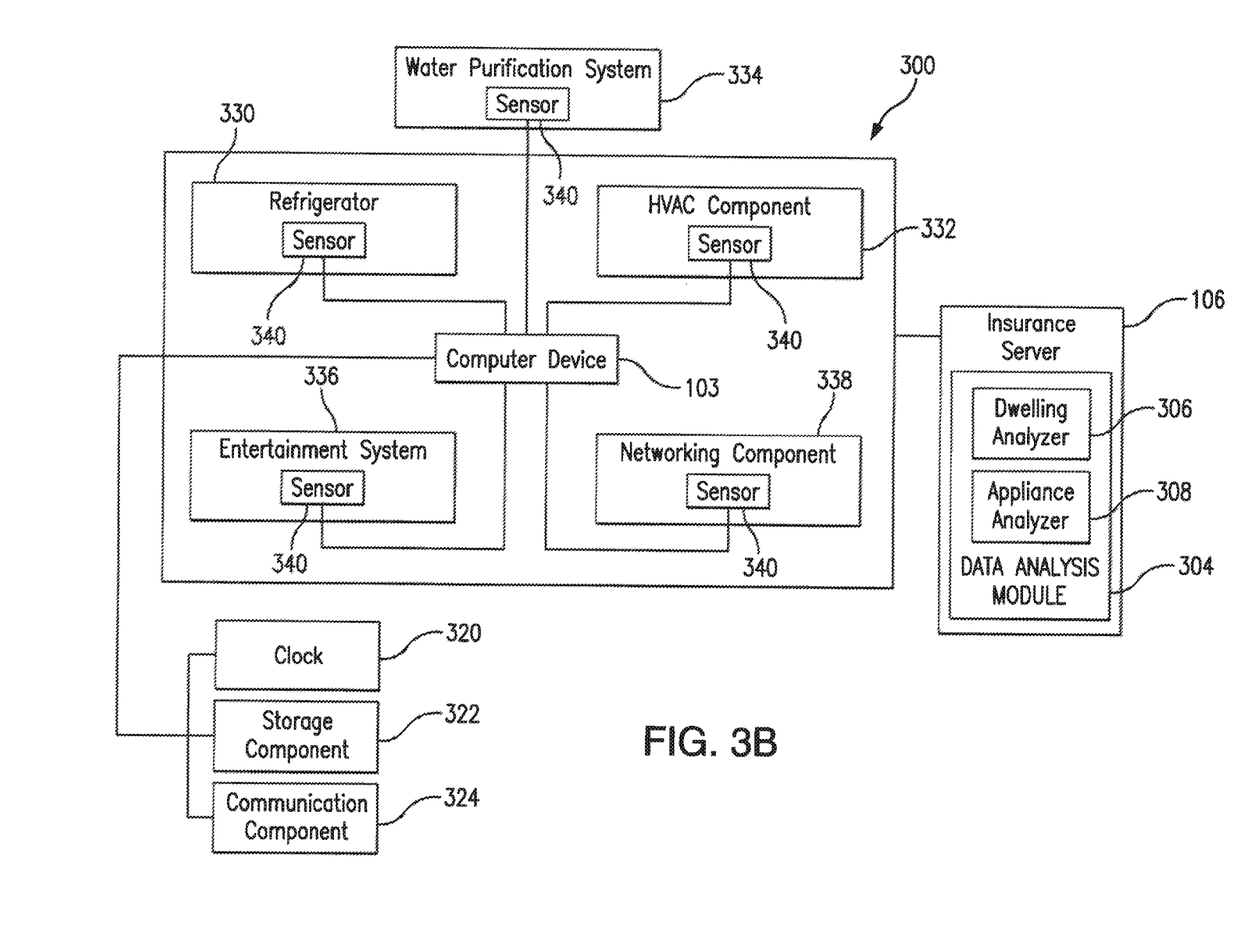
FIG. 3B is a block diagram of a plurality of appliances located inside or in the vicinity of an insured property from which sensor data is captured for subsequent analysis in accordance with an illustrated embodiment.

As previously noted, insured property 300 may contain a plurality of appliances located therein or in its vicinity. FIG. 3B is a block diagram illustrating such appliances from which sensor data is captured for subsequent analysis in accordance with an illustrated embodiment. Computing device 103 elements such as clock 320, storage component 322 and communication component 324, as well as sub-modules of data analysis module 304 have already been described with respect to FIG. 3A. For brevity, those elements are not further described with respect to FIG. 3B. In addition to those elements already described, illustratively, a plurality of appliances are depicted in FIG. 3B. Examples of appliances include (but are not limited to) all kitchen appliances (e.g., refrigerator 330, freezer, stove, cooktop, oven, grill, dishwasher, etc.); HVAC components 332 (air conditioner, heating system, air handlers, humidifiers/de-humidifiers, etc.), water purification system 334, media entertainment system 336 (e.g., televisions), networking components 338 (routers, switches, extenders, etc.), electrical generator system, and the like. In many of the embodiments, appliances 330-338 have a computer based architecture or a controller that enables communication of data concerning the electronic appliance. It is to be understood appliances 330-338 may be located in any location inside or outside of insured property 300, and their positions are not limited to the example depicted in FIG. 3B. In addition, a plurality of appliance sensors 340 may be attached to and/or operatively connected to controllers of appliances 330-338.

Each of the appliance sensors 340 may be configured and operational to preferably detect various operating parameters relating to appliances 330-338 within or outside the insured property 300. An appliance sensor may comprise detection hardware, or may employ one or more remote probes, which may be located inside and/or outside the insured property 300, functional to detect certain operating parameters of appliances 330-338. Operating parameters detected by an appliance sensor 340 may include (but are not limited to): the operating efficiency of an appliance (energy usage, output performance); the time an appliance operates, the age of an appliance. Such appliance readings from one or more appliances 330-338 could thus be recorded by device 103 and used by an appliance analyzer 308 in various ways. It is additionally to be understood and appreciated that appliance sensors 340 can also be networked into a central computer hub (e.g., device 103) in an insured property to aggregate collected sensor data packets. Computing device 103 may communicate its data to server 106.

Figure 4:
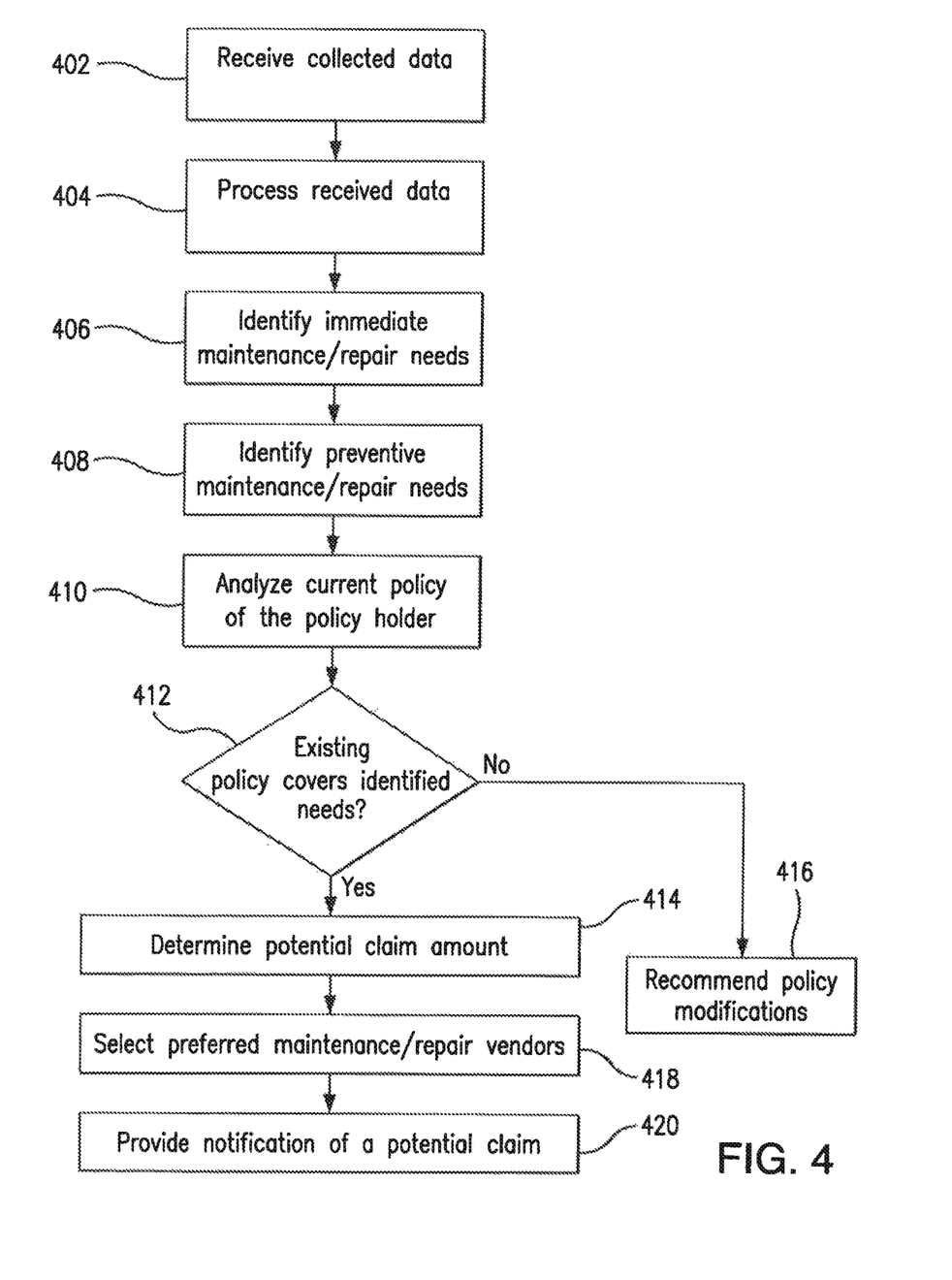
FIG. 4 is a flow diagram of operational steps of the analyzer module of FIGS. 3A-3B in accordance with an illustrated embodiment.
Figure 5:
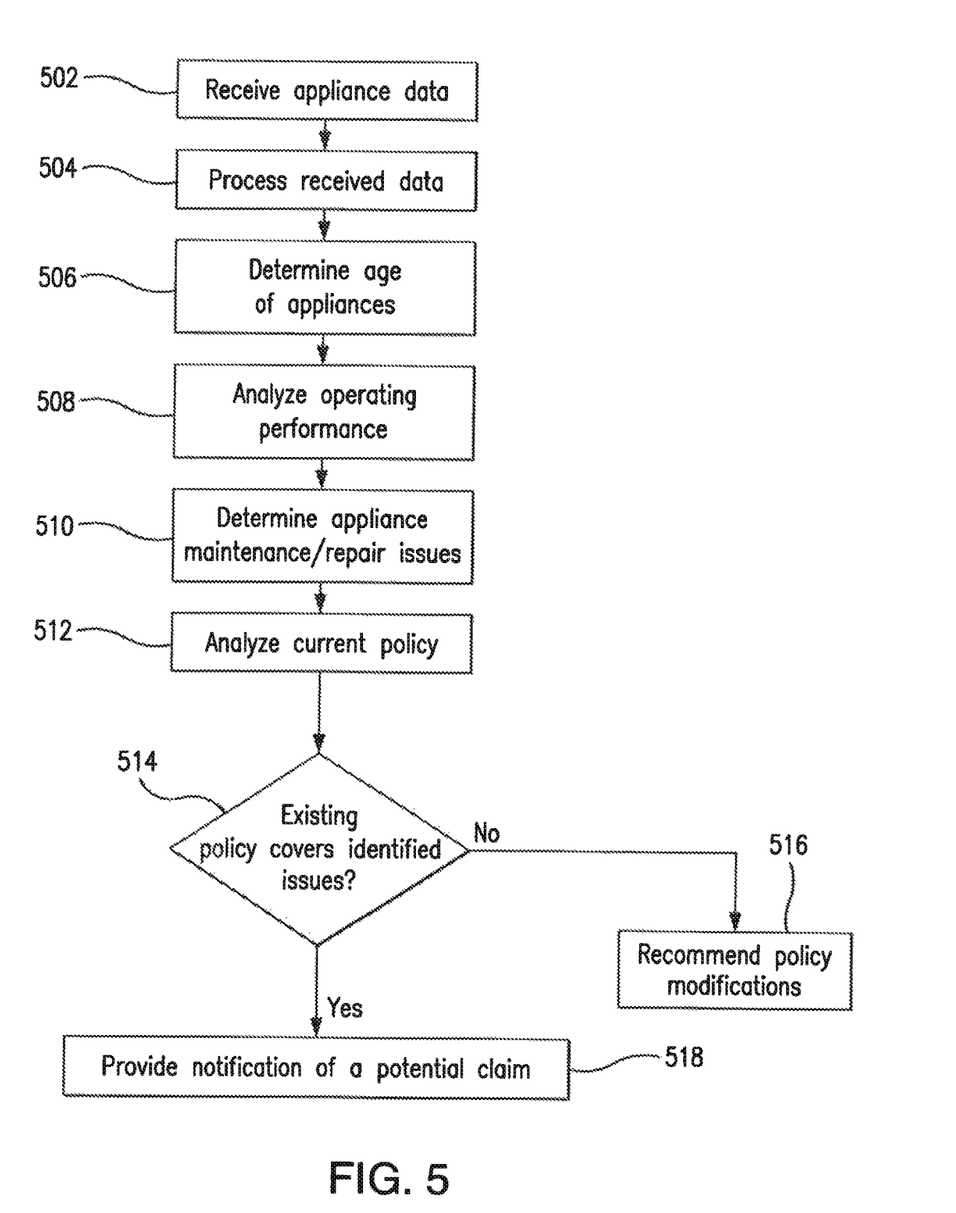
FIG. 5 is a flow diagram of operational steps of the appliance analyzer module of FIGS. 3A-3B in accordance with an illustrated embodiment.

FIGS. 4 and 5 show, in the form of a flow chart, exemplary operational steps of the analyzer 306 and appliance analyzer 308, respectively. Before turning to descriptions of FIGS. 4 and 5, it is noted that the flow diagram shown therein are described, by way of example, with reference to components shown in FIGS. 1, 2, 3A and 3B, although these operational steps may be carried out in any system and are not limited to the scenario shown in the aforementioned figures. Additionally, the flow diagrams in FIGS. 4 and 5 show an example in which operational steps are carried out in a particular order, as indicated by the lines connecting the blocks, but the various steps shown in these diagrams can be performed in any order, or in any combination or subcombination.

With reference to FIG. 4, at 402, analyzer 306 preferably collects data from sensors 102. In an embodiment of the present invention, this step may involve computing device 103 periodically contacting (via network 100), at prescribed time intervals, data analyzer component 304 running on server 106 to send accumulated data. In an alternative embodiment, contact between the computing device 103 and analyzer 306 may be initiated when the analyzer 306 contacts the computing device 103. Following the initial contact, analyzer 306 may receive data from the computing device 103. It is to be understood data packets collected from sensors 102 can be aggregated in computing device 103 and send as an aggregated packet to analyzer 306 for subsequent analysis.

At 404, analyzer 306 preferably processes the received data. For example, analyzer 306 may include a parser configured to parse the aggregated packet and classify the received data based on, for example, type of sensor employed to collect a particular subset of the received data. Analyzer 306 may create a data structure for each classification. This step may further involve identifying a policy holder associated with insured property 300 from which the received data is collected.

At 406, based on data collected from sensors 102 regarding an insured property 300, analyzer 306 conducts an analysis to determine recommendations to make certain immediately needed repairs to the structure of an insured property 300. For instance a hole may have been detected in the roof of insured property 300 (via one or more sensors 102), requiring immediate repair. As another example, an environmental sensor may have detected a gas leak or any contaminant adverse to human health. As another example, insured property temperature analysis may have indicated a malfunctioning cooling/heating system. In general, any condition that affects the residents' health or safety may be considered by analyzer 306 as requiring an immediate repair. Similarly, at 408, analyzer 306 conducts an analysis to identify certain preventive repairs to the structure of an insured property 300. For example, based upon certain analysis, analyzer 306 may recommend preventive maintenance to the roof an insured property 300 (e.g., detection of wind, moisture, improper roof slope line, etc.). As another example, based upon analysis of a plumbing system, analyzer 306 may have detected long-term stress on pipes. In order to prevent water leaks, analyzer 306 may recommend reducing water pressure (e.g., by installing a water softener) to prevent future plumbing leaks. As another example, based upon, for example, an air flow analysis, analyzer 306 may have detected that damaged frames and/or dividers allow air leaks into insured property 300. Thus, analyzer 306 may make recommendations with regards to window replacement/repair needs.

At 410, analyzer 306 preferably analyzes current insurance policy of an owner of insured property 300 with respect to either immediate and/or preventive needs identified at steps 406 and 408. For example, analyzer 306 may determine whether policyholder's current policy covers any of the identified maintenance/repair needs. In response to determining that the current policy does not cover identified immediate/preventive repair and/or maintenance issues (step 412, no branch), analyzer 306, at 416, preferably recommends one or more current policy modifications based on the analysis performed at step 410. For example, if analyzer 306 determines that the current policy of the insured property resident does not cover any of the preventive repairs, a recommendation may be made to add such coverage to the pre-existing policy.

In response to determining that current policy covers some or all of the identified immediate/preventive repair and/or maintenance needs (step 412, yes branch), analyzer 306, at 414, preferably determines potential claim amount. For example, analyzer 306 may determine the total amount of benefits potentially payable on claims associated with identified needs, if the policyholder chooses to make one or more claims against the insurance policy. In this step, analyzer 306 may derive the total amount of benefits based upon, for example, the total repair estimate amount. The total repair estimate amount may include both a labor estimate and a parts estimate.

At 418, analyzer 306 preferably selects one or more preferred maintenance/repair vendors. Maintenance/repair vendors are separate entities, each with the capability to perform a particular type of repair. For example, one vendor may specialize in restoration work on roofing, siding, gutters and windows. Another vendor may have the capability to repair and fix the gas leak. Thus, analyzer 306 may select one or more preferred vendors based, at least in part, on data collected from sensors 102. In an embodiment of the present invention, the preferred vendors can have exclusive capabilities, meaning that the capability to handle any one particular repair by one vendor is not shared by the remaining vendors. In an alternative embodiment, the preferred vendors can have nonexclusive capabilities, meaning that the capability to handle any one repair service by any one vendor is shared by one or more remaining vendors. Moreover, the capabilities of various vendors to handle the same type of repair may involve different technologies and charges (i.e., costs). The preferred vendor list may be stored, for example, in insurance server 106 database.

At 420, analyzer 306 preferably provides a notification of a potential claim under the policyholder's insurance policy. It is to be appreciated that analyzer 306 may be configured to deliver all notifications regarding the potential claim corresponding to the determined repair/maintenance services electronically. The notification can be anything that advises a policy holder, device, or computer system of the maintenance/repair issue, including but not limited to, a display of text on a local display screen, a message in an email sent to a local or remote computer, a text message, a communication to a remote computer system. It is to be also understood and appreciated that analyzer 306 may be configured and operational to integrate with policy holder's communicative computing devices (e.g., smart phones (via an app), computers, tablets, smart TV's, vehicle communication systems, etc.) for sending such notifications regarding such potential insurance claims. In an embodiment of the present invention, each notification may include, but not limited to, one or more immediate repair and/or preventive repair (maintenance) needs, the total amount of benefits potentially payable on corresponding claim(s), preferred repair/maintenance vendors and any additional information related to the potential insurance claim.

Additionally, recommendations may be made with regards to appliances 330-338 in the insured property 300. FIG. 5 is a flow diagram of operational steps of the appliance analyzer module of FIGS. 3A-3B in accordance with an illustrated embodiment. With reference to FIG. 5, at 502, appliance analyzer 308 preferably collects data from a plurality of appliance sensors 340 (shown in FIG. 3B). As already has been discussed with respect to analyzer 306, in the context of FIG. 4, contact between the computing device 103 and appliance analyzer 308 may be initiated by either the appliance analyzer 308 or computing device 103. Following the initial contact, appliance analyzer 308 may receive data from the computing device 103. It is to be understood data packets collected from appliance sensors 340 can be aggregated in computing device 103 and sent as an aggregated packet to appliance analyzer 308 for subsequent analysis.

At 504, appliance analyzer 308 preferably processes the received data. For example, just like the analyzer 306 discussed above, appliance analyzer 308 may include a parser configured to parse the aggregated packet and classify the received data based on, for example, type of appliance corresponding to a particular subset of the received data. Appliance analyzer 308 may create a data structure for each classification. This step may further involve identifying a policy holder associated with insured property 300 in which the analyzed appliances are located.

At 506, appliance analyzer 308 preferably determines the age of the appliances 330-338 or parts thereof and/or length of service of the appliances 330-338 based on data captured from sensors 340. At 508, appliance analyzer 308 preferably analyzes operating parameters with respect to appliances 330-338. This step may further involve analyzing environmental conditions in which appliances 330-338 operate. For example, appliance analyzer 308 may use environmental data measured with a plurality of sensors 102 situated at or near the analyzed appliances 330-338. The environmental data may be indicative of temperature, humidity, pressure, averages of the foregoing measurements over a time period, etc. More specifically, appliance analyzer 308 may be configured to identify maintenance/repair issues based upon environmental conditions in conjunction with operating parameters.

At 510, appliance analyzer 308 preferably identifies one or more maintenance/repair issues with respect to appliances 330-338. As nonlimiting examples, the maintenance/repair issue can be any one or more of the following: a need for replacement of the appliance 330-338 or a component thereof, a need for repair of the appliance 330-338 or a component thereof, a need for battery recharging, lifespan expired, lifespan below a predefined threshold, power inadequacy, appliance inoperability for intended purpose, inoperability of one or more functions (electrical and/or mechanical), network connectivity failure, and the like. For instance, appliance analyzer 308 may detect performance degradation of an appliance (e.g., refrigerator 330) upon either it's past operating performance efficiency and/or its operating performance falling outside of threshold values prescribed for it by a manufacturer. As another nonlimiting example, appliance analyzer 308 may detect a dirty filter in another appliance (e.g., HVAC component 332) and/or may detect degradation in HVAC component 332 performance likely contributable to a dirty filter element.

At 512, appliance analyzer 308 preferably analyzes current appliance insurance policy or other product or service contract of an owner of insured property 300 with respect to maintenance/repair issues identified at step 510. For example, appliance analyzer 308 may determine whether current insurance policy, other product, or service contract of the policyholder covers any of the identified maintenance/repair needs. In response to determining that the current policy, other product, or service contract does not cover at least one of the identified appliance maintenance/repair issues (step 514, no branch), appliance analyzer 308, at 516, preferably recommends one or more insurance policy modifications, other product, or service contract based on the analysis performed at step 410. For example, if appliance analyzer 308 determines that the current appliance insurance policy does not cover performance degradation for any of the appliances 330-338 situated within the insured property 300, a recommendation may be made to add such coverage to the pre-existing policy.

In response to determining that the current policy, other product, or service contract covers some or all of the identified appliance repair/maintenance issue (step 514, yes branch), appliance analyzer 308, at 518, preferably provides a notification of a potential claim under the policyholder's appliance insurance policy, other product, or service contract. As previously noted, the notification can be anything that advises a policyholder, device, or computer system of the appliance maintenance/repair issue, including but not limited to, a display of text on a local display screen, a message in an email sent to a local or remote computer, a text message, a communication to a remote computer system. Appliance analyzer 308, may further include programming instructions to engage in a communication session over the Internet with a remote computer system (not shown in FIG. 3B) associated with an appliance manufacturer, an appliance vendor, a repair service entity, a replacement service entity, or an appliance information provider, and during the communication session, obtain information related to service, replacement, maintenance, etc., in connection with one or more of the appliances 330-338. According an embodiment of the present invention, each notification provided at 518 may list one or more repair/maintenance needs, the total amount of benefits potentially payable if the policyholder chooses to initiate the potential claims, preferred repair/maintenance vendors and any additional information related to the potential claim.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A sensor system for capturing data, the sensor system comprising:
a plurality of sensor devices each configured to capture data relating to a property, wherein each sensor device includes a transmitter having an associated IP address coupled to a wireless network for transmitting the captured data, and wherein each sensor device periodically captures data relating to the property in accordance with a data capture frequency value;
a data storage component wirelessly coupled to each of the plurality of sensor devices via the associated IP address of the transmitter for each of the sensor devices, wherein the data storage component aggregates the captured data relating to the property received from each of the sensor devices;
a communication component coupled to the data storage component that encrypts and transmits the aggregated captured data via the wireless network;
a computer server coupled to the communication component, via the wireless network, and programmed to:
receive a first set of captured encrypted data from an appliance sensor configured to collect data regarding a plurality of categories of appliance data, wherein the appliance data is associated with a first appliance from one or more appliances within the property and comprises operating parameters comprising an age value and a length of service value associated with the first appliance;
upon analyzing appliance data of the first appliance with respect to an operating parameter, identify an environmental sensor situated at or near the first appliance, wherein the environmental sensor is configured to collect environmental data;
generate and transmit an instruction to the environmental sensor situated at or near the first appliance to measure environmental data, wherein the instruction modifies an additional data capture frequency value of the environmental sensor situated at or near the first appliance by commanding an immediate measurement of environmental data;
receive a second set of captured encrypted data from the environmental sensor comprising environmental data;
determine an appliance condition for the first appliance based on the first set of captured encrypted data exceeding a threshold value and the second set of captured encrypted data; and
generate and transmit an electronic message to a remote computing device comprising a notification based upon the determined appliance condition for the first appliance.

2. The sensor system as recited in claim 1, wherein the notification identifies one or more potential claims associated with the property.

3. The sensor system as recited in claim 2, wherein the notification relates to a structural condition of the property.

4. The sensor system as recited in claim 2, wherein the notification relates to repairs to be made regarding the property.

5. The sensor system as recited in claim 2, wherein the notification relates to one or more appliances associated with the property.

6. The sensor system as recited in claim 5, wherein the notification relates to repairs to be made regarding the one or more appliances associated with the property.

7. The sensor system as recited in claim 1, wherein the environmental sensor is configured to collect a plurality of categories of property information comprises one or more of temperature; humidity; water; wind speed; motion; electrical; structural; environmental; appliance and camera.

8. The sensor system as recited in claim 1, wherein the notification comprises an amount owed for one or more repair actions to be taken for the property.

9. The sensor system as recited in claim 1, wherein the computer server is further programmed to determine one or more third party vendors regarding repairs to be made to the first appliance.

* * * * *

UNITED STATES PATENT AND TRADEMARK OFFICE
CERTIFICATE OF CORRECTION

PATENT NO. : 10,181,159 B1
APPLICATION NO. : 14/278182
DATED : January 15, 2019
INVENTOR(S) : Michael J. Allen et al.

It is certified that error appears in the above-identified patent and that said Letters Patent is hereby corrected as shown below:

On the Title Page

1. In Item (71), under "Applicant", in Column 1, Lines 1-2, delete "United Services Automobile Association," and insert -- United Services Automobile Association (USAA), --, therefor.

In the Drawings

2. In Fig. 5, Sheet 6 of 6, for Step "508", in Line 2, delete "performance" and insert -- parameters --, therefor.

In the Specification

3. In Column 1, Line 8, delete "Ser. No." and insert -- Ser. Nos. --, therefor.

4. In Column 4, Line 15, delete "and or" and insert -- and/or --, therefor.

5. In Column 9, Line 18, delete "air the" and insert -- air that --, therefor.

6. In Column 9, Line 26, delete "air the" and insert -- air that --, therefor.

7. In Column 12, Line 23, delete "like. analyzer" and insert -- like. Analyzer --, therefor.

8. In Column 16, Lines 46-47, delete "According an" and insert -- According to an --, therefor.

Signed and Sealed this
Ninth Day of April, 2019

Andrei Iancu
*Director of the United States Patent and Trademark Office*